Figure 1:
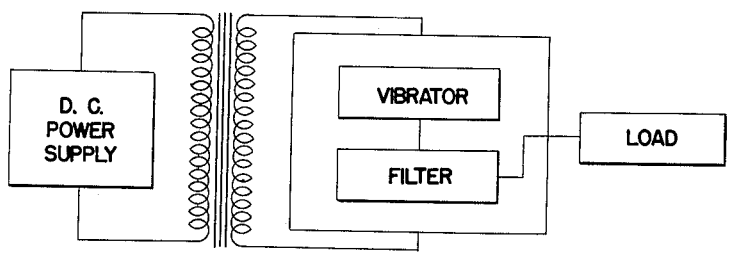

April 18, 1961 V. W. BEARINGER ET AL 2,980,841
ELECTROSTRICTIVE VIBRATOR
Filed Dec. 26, 1956

INVENTOR.
FINN J. LARSEN
VAN W. BEARINGER
BY
Orrin M. Haugen
ATTORNEY

United States Patent Office 2,980,841
Patented Apr. 18, 1961

2,980,841

ELECTROSTRICTIVE VIBRATOR

Van W. Bearinger and Finn J. Larsen, Edina, Minn., assignors to Minneapolis-Honeywell Regulator Company, Minneapolis, Minn., a corporation of Delaware Filed Dec. 26, 1956, Ser. No. 630,531

8 Claims. (Cl. 321—2)

The present invention relates to an electrical translating assembly including an electrostrictive vibrator the assembly being adapted to convert relatively low potential D.C. electrical energy to relatively high potential electrical energy. More specifically, the invention relates to a polycrystalline dielectric electrostrictive vibrator assembly wherein the vibrator element per se is actuated by the secondary of a step-up transformer.

Electrostrictive type relays are well known in the art today, and the active portion of the relay may include, for example, a bimorph of barium titanate or similar substance backed with a relatively flexible metal backing member. Upon energization of the electrostrictive member, longitudinal expansion occurs thereby providing a bending stress which will cause the bimorph to assume an arcuate configuration. Furthermore, it is well known that the electrostrictive type material such as barium titanate is highly desirable for use as a bimorph-type bending element due to its extremely low electrical loss characteristics when a field is impressed across a body. In other words, the extremely high resistance of this type of electrostrictive material allows very low leakage of energy to occur during operation. In order to take advantage of these desirable features it is necessary to energize the electrostrictive member with a relatively high electrical potential in order that proper energization of the element be realized. Provided the electrostrictive member is not electrically polarized or activated before use, the direction of the stress will be independent of the direction of the applied field since the amplitude of the stress in this case is a function of the square of the applied field. In other words, any applied field regardless of its polarity, will institute a mechanical strain in the same direction in the active element.

In accordance with the present invention, the vibrator circuit includes an electrostrictive relay having a bimorph element including one member of an electrostrictive material such as barium titanate, the relay being energized by means of the secondary of a step-up transformer. Means are provided for discharging the active element of the relay upon substantially complete energization whereupon the bimorph will relax and assume an unstrained condition, therefore providing a mechanical vibrator action in the relay. Of course, when operated in this manner, relatively low potential D.C. power may be utilized such as, for example, ordinary flashlight cells or the like, this potential capable of being stepped up. Because of the extremely low loss characteristic of the devices employed in connection with the present invention, power dissipation of the unit is extremely small, the overall operation thereby being highly efficient. Accordingly, devices employing the vibrator element of the present invention may be readily adapted for use in portable equipment requiring relatively high electrical potential, such as, for example, in photoflash equipment and the like.

Therefore, it is an object of the present invention to provide an electrostrictive vibrator utilizing a ceramic electrostrictive substance such as barium titanate, calcium titanate or the like as the active ingredient, this vibrator being energized by low potential D.C. power.

It is a further object of the present invention to provide an electrostrictive vibrator of the polycrystalline dielectric type having extremely small energy losses in its operation and in which the amplitude of the stress is a function of the square of the applied field.

It is still a further object of the present invention to provide an electrostrictive vibrator of the type employing a polycrystalline dielectric type active ingredient requiring relatively high activation voltages wherein the activating energy is obtained from the secondary of a step-up transformer.

Figure 2:
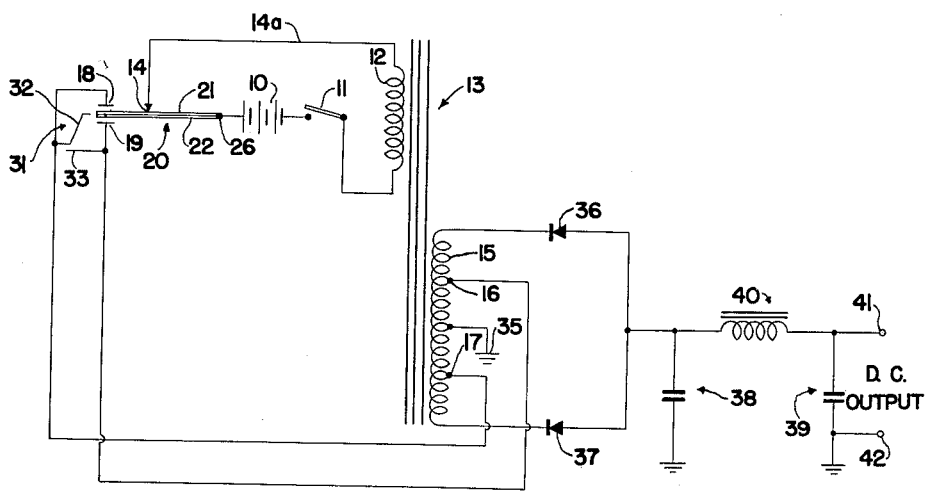
Figure 3:
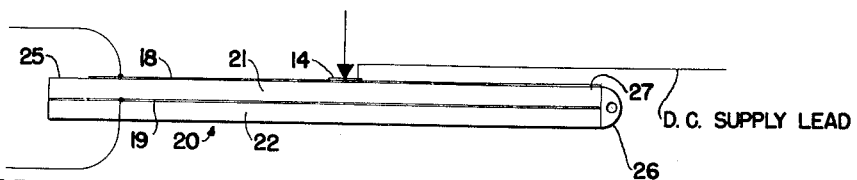
Figure 4:
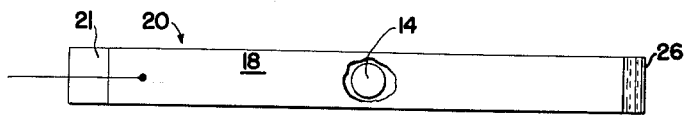

Other and further objects of the present invention will become apparent upon a study of the accompanying drawing and specification wherein;

Figure 1 is a schematic drawing in block form showing the general assembly of the present invention; and Figure 2 is a schematic drawing illustrating one modification of the present invention in a circuit diagram; and Figure 3 is a horizontal section view of an electrostrictive vibrating member or bimorph motor taken along the lines and in the direction of the arrows 3—3 of Figure 4; and Figure 4 is a top plan view of an electrostrictive bimorph motor which may be utilized as the vibrator of the present assembly.

In accordance with the preferred modification of the present invention, the vibrator circuit illustrated in Figure 2 includes a D.C. power source 10 which may be, for example, one or more ordinary flashlight cells or the like controlled in the circuit by the switch member 11. The primary winding 12 of the transformer generally designated 13 is activated upon closing of the switch 11, the energy being carried by the circuitry 14a of the D.C. power or primary winding supply through the normally closed contact 14. The secondary winding 15 of the transformer 13 has midtaps at 16 and 17 to provide a relatively high potential of electrical energy charge across the charging electrodes 18 and 19 of the bimorph motor generally designated 20. It is noted that the charging electrodes 18 and 19 are illustrated as removed from the body of the motor 20. This is shown merely to simplify explanation, and reference is made to Figures 3 and 4 for a true illustration of the device and its associated circuitry. The bimorph motor 20 includes an electrostrictive polycrystalline dielectric slab 21 such as barium titanate or the like backed by a beryllium copper or other suitable backing member 22. When a conductive backing strip is utilized, electrode 19 may not be required provided that good electrical contact may be made between the strip and the titanate wafer. The relay is further provided with a contact member 14 which is adapted to make contact with the external circuitry 14A. One end 25 of the bimorph motor 20 is free in order to accommodate slight cantilever movement of the evtremities of motor 20 when a stressed or arcuate configuration is assumed. Suitable mounting means 26 are provided for the clamped end 27 of the motor 20. Thus, upon energization of the electrostrictive motor 20 an internal stress occurs within the polycrystalline dielectric material 21 causing for example, longitudinal expansion which causes tthe element 20 to assume an arcuate configuration. Upon energization of the member 21 and upon attaining an arcuate or stressed form, contact with element 14 is broken. Of course, when contact is broken at element 14, transformer 13 provides an additional surge of power to the electrostrictive member 21. Subsequently, the discharging means generally designated 31 are contacted thereby substantially discharging the polycrystalline dielectric substance and causing it once again to assume a relaxed position. Thus, upon stressing of the member 20 after contact has initially been made with the circuit element 14, the discharging electrode 32 makes contact with member 33 and thereby discharges the stored energy in the capacitor formed by the dielectric slab 21. After travel upwards, contact is re-established through member 14 with the electrostrictive member in relaxed position. Thus, vibrator type action is achieved with the polycrystalline dielectric material and the action then carries on in a relatively continuous fashion. The high potential charge which is required for polycrystalline dielectric materials of this sort is therefore supplied by means of the high voltage available in the secondary of the step-up transformer 13. The frequency of the vibrations depend basically upon the resonant frequency and the inertia of the bimorph motor and these factors should be arranged to be compatible with the characteristics of the transformer 13. These matters are, of course, specific to individual arrangements and combinations, and are sufficiently straightforward and clear so as to be obvious to those skilled in the art.

The output of the modification of the apparatus which is shown in Figure 2 provides a relatively high voltage D.C. type of electrical energy. Thus, from the secondary of the transformer 13 which is grounded at the center as at 35, there is provided a pair of rectifiers 36 and 37 which are adapted to pass unidirectional electrical energy. On the downstream side of the rectifiers 36 and 37, there are a pair of filtering condensers 38 and 39 straddling a choke coil 40. This arrangement of circuitry components provides a relatively even flow of unidirectional or D.C. type of electrical energy from the secondary 15 of the transformer 13. Thus, upon connecting a suitable component to the output terminals 41 and 42 of the system, relatively high potential unidirectional power may be obtained.

Although various modifications of the present invention are disclosed in the present specification, it will be understood that the illustrations are given for purposes of clarifying the disclosure only and are not be interpreted as any limitation upon the scope of the present invention. Therefore, it will be understood that various other modifications of the present invention may be utilized without departing from the spirit and scope of the present invention.

We claim as our invention:

1. Apparatus for converting relatively low voltage D.C. electrical energy to relatively high voltage electrical energy comprising a primary source of relatively low voltage D.C. power, a transformer having a primary winding and a secondary winding, the primary winding being conductively connected to said power source, an electrostrictive bimorph driven relay energized by said secondary winding, means for de-energizing said bimorph motor when energized to provide vibrator type action, means for interrupting flow of power to said transformer upon flexing of said bimorph, and an output circuit associated with said secondary winding.

2. Means for converting relatively low voltage D.C. electrical energy to relatively high voltage electrical energy comprising a source of relatively low voltage D.C. electrical energy, a transformer having a primary winding and a secondary winding, the said primary winding being conductively connected to said power source, an electrostrictive bimorph driven relay having a pair of charging electrodes, a first and a second contact member and discharging means associated with said electrodes, said bimorph adapted to deform upon impression of relatively high voltage electrical energy across said electrodes, said first and second contact members being arranged to interrupt flow of electrical energy to said primary winding upon attaining a certain predetermined degree of deformation, and said discharging means adapted to remove the charge from said electrodes when the relay assumes a further deformed configuration.

3. A vibrator for converting relatively low potential D.C. energy to relatively high potential energy comprising a relatively low potential D.C. source, a transformer having a primary winding conductively connected to said source and a secondary winding conductively connected to an output circuit, an electrostrictive relay connected to said secondary winding having a bimorph motor which normally assumes a relaxed position and a stressed position when energized, means for energizing said motor when relaxed and means for de-energizing said motor and said primary winding when said bimorph motor is stressed so as to provide vibrator action in said relay.

4. In a vibrator circuit, an electrostrictive bimorph motor having a pair of conductive electrodes positioned on opposite surfaces thereof and arranged to flex to a predetermined degree upon application of a certain predetermined potential thereacross, a primary source of power having an output potential less than said predetermined potential, a step-up transformer having primary and secondary windings, the secondary winding being arranged to deliver an output potential which is at least equal to the said predetermined potential while the primary winding thereof is being energized by said power source, conductive means connecting the primary winding to said primary source of power and the secondary winding to the electrodes of said bimorph motor, means for de-energizing the primary of said transformer and said bimorph motor when said motor has been flexed to a predetermined degree, and an output circuit being initiated from said secondary winding.

5. The apparatus as defined in claim 4 being particularly characterized in that the active portion of the electrostrictive bimorph motor consists essentially of an electrostrictive titanate.

6. In a vibrator circuit, an electrostrictive bimorph motor having a pair of conductive electrodes positioned on opposite surfaces thereof and arranged to flex to a predetermined degree upon application of a certain predetermined potential thereacross, a primary source of power having an output potential less than said predetermined potential, a step-up transformer having primary and secondary windings, the secondary winding being arranged to deliver an output potential which is at least equal to the said predetermined potential while the primary winding thereof is being energized by said power source, conductive means electrically connecting the primary winding to said primary source of power through said bimorph motor, and the secondary winding to the electrodes of said bimorph motor, means for disengaging the primary of said transformer from said power source upon flexing of said bimorph to a certain portion of said predetemined degree, and means for de-energizing said bimorph motor when said motor has been flexed to said predetermined degree, thereby providing vibrator-type action.

7. Means for converting relatively low potential direct current power to relatively high direct current power comprising; an electrostrictive bimorph motor having individual charging electrodes positioned on opposite faces thereof, said bimorph being arranged to flex to a predetermined degree upon application of a certain predetermined potential thereacross, a primary direct current source of power having an output potential which is less than said predetermined potential, a step-up transformer having primary and secondary windings, the secondary winding being arranged to deliver an output potential which is at least equal to said predetermined potential while the primary is being energized by said power source, conductive means connecting the primary winding to said primary source of power, and the secondary winding to the electrodes of said bimorph motor, means for de-energizing the primary of said transformer and said bimorph motor when said motor has been flexed to said predetermined degree, and an output load circuit including rectification means being taken from said secondary winding.

8. In a vibrator circuit, a primary source of power, a transformer having a primary and a secondary winding, the said primary winding being conductively connected to said power source, an electrostrictive bimorph motor having a pair of charging electrodes, and an output circuit from the secondary of said transformer, said charging electrodes being conductively connected to the secondary of said transformer, and means for interrupting flow of power to said transformer when said motor is flexed to a predetermined degree.

References Cited in the file of this patent

UNITED STATES PATENTS

| | | |
|---|---|---|
| 1,693,806 | Cady | Dec. 4, 1928 |
| 2,167,254 | Skellett | July 25, 1939 |
| 2,449,048 | Bendixen | Sept. 14, 1948 |
| 2,473,353 | Aust | June 14, 1949 |
| 2,616,223 | Janker | Nov. 4, 1952 |
| 2,676,273 | Oestreicher | Apr. 20, 1954 |
| 2,783,431 | Brown | Feb. 26, 1957 |
| 2,835,761 | Crownover | May 20, 1958 |